T. ALEXANDER.
EXCAVATING SHOVEL.
APPLICATION FILED MAR. 19, 1912.
1,074,538.
Patented Sept. 30, 1913.
3 SHEETS—SHEET 2.
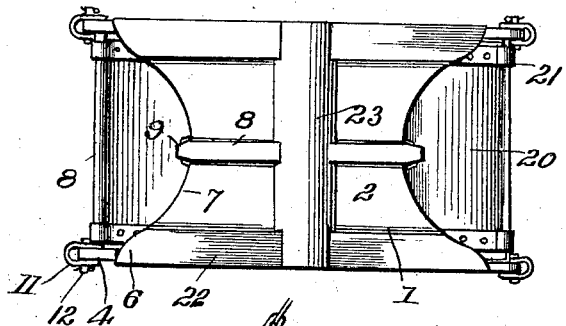
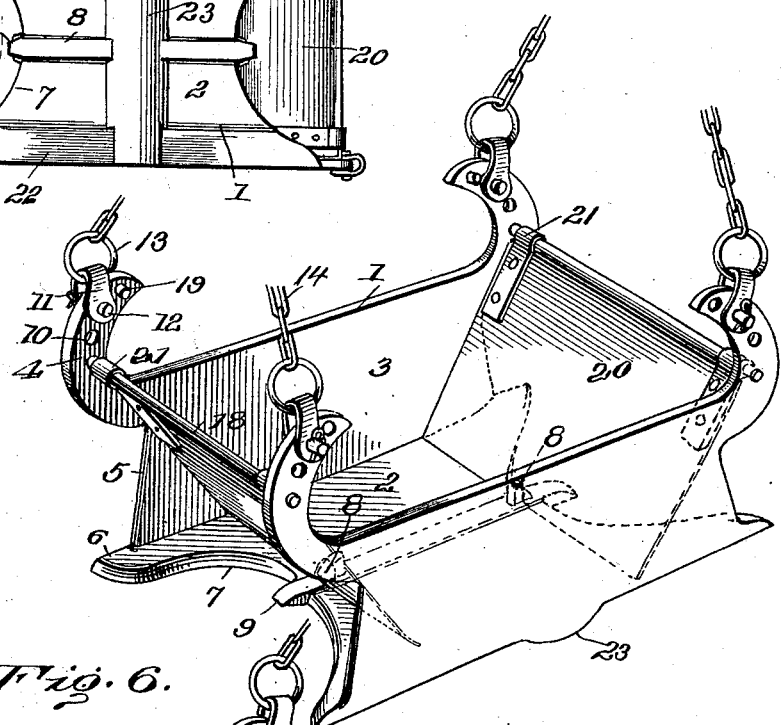
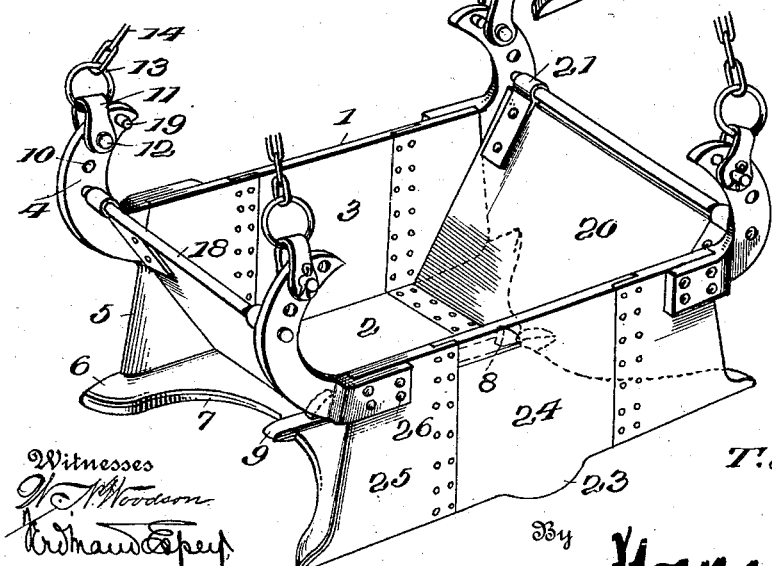
Inventor
T. Alexander.

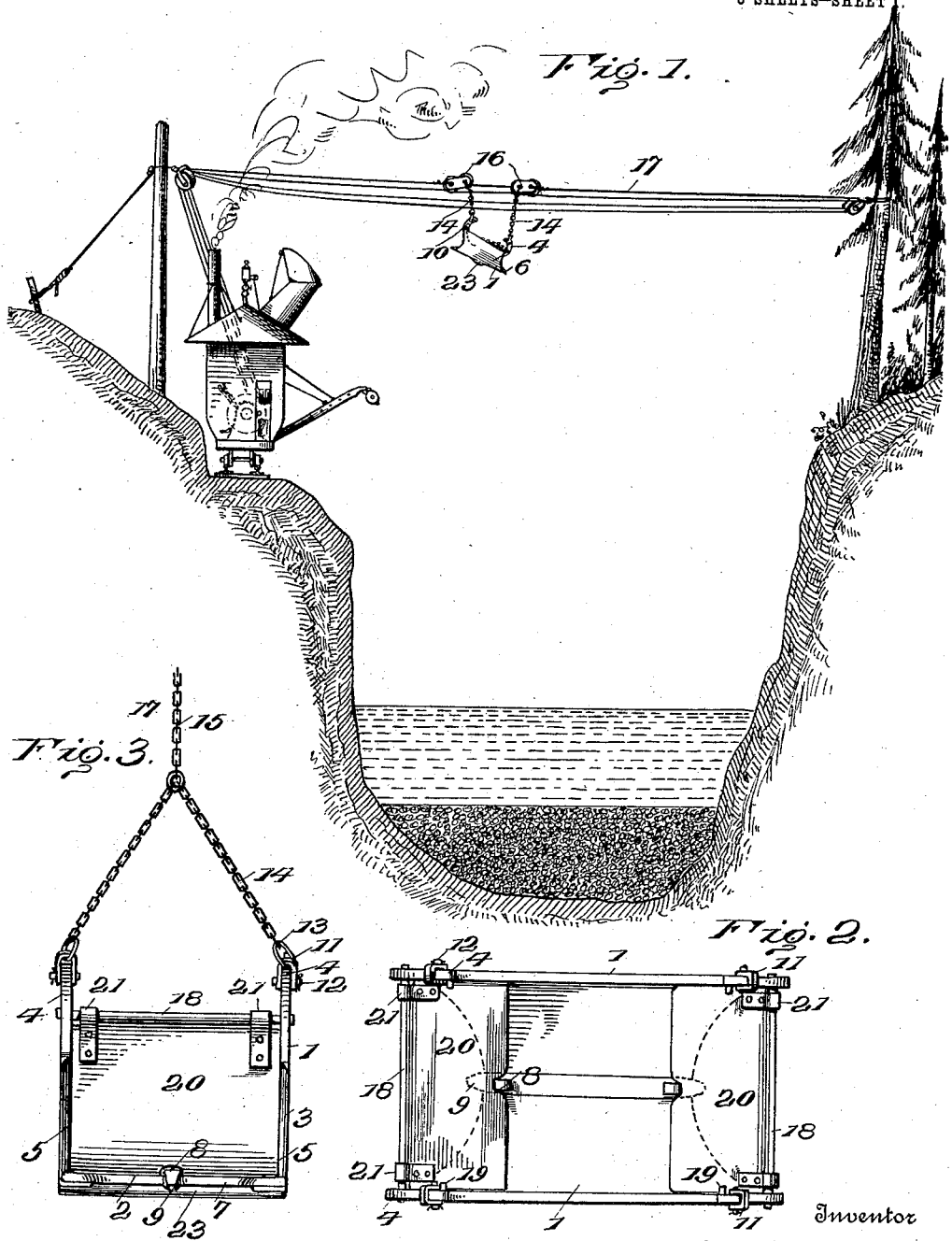

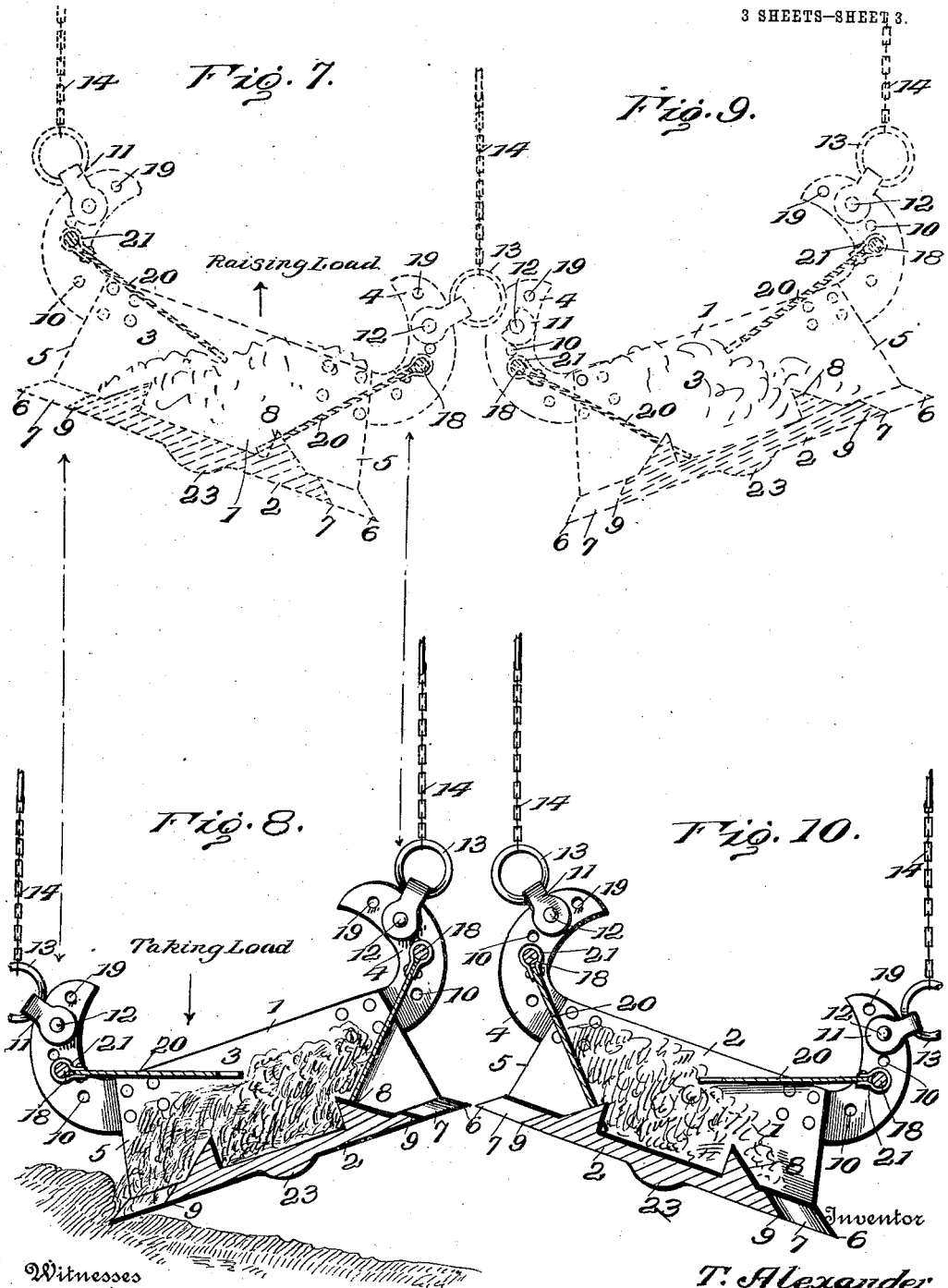

UNITED STATES PATENT OFFICE.

TONY ALEXANDER, OF SAN FRANCISCO, CALIFORNIA.

EXCAVATING-SHOVEL.

1,074,538.  Specification of Letters Patent.  Patented Sept. 30, 1913.

Application filed March 19, 1912. Serial No. 684,844.

*To all whom it may concern:*

Be it known that I, TONY ALEXANDER, citizen of the United States, residing at San Francisco, in the county of San Francisco and State of California, have invented new and useful Improvements in Excavating-Shovels, of which the following is a specification.

This invention has relation to excavating shovels especially adapted to be used for removing submerged material from river bottoms, canals, ditches and the like, and has for its object to provide a strong and durable shovel especially adapted to withstand the strains to which it is subjected when in use.

The shovel is open at its ends and the parts are so arranged that the shovel may load and dump at either end, and by reason of this arrangement considerable time is saved in loading and dumping the shovel by passing it transversely across the stream alternately in opposite directions and causing it to dump alternately at the opposite sides of the steam.

The shovel is designed to be used in connection with hauling, raising and lowering cables usually employed in connection with apparatus in engineering practice for controlling these cables.

The shovel is provided at its ends with hinged gates and when the shovel is drawn into material the gate at the loading end of the shovel is elevated and is held in an elevated position by the material which enters the shovel. When the shovel is raised it is held at an inclined position so that the material will not fall from the shovel during the time that it is being raised. The material may be dumped from the shovel by raising one end thereof or lowering the other end, or by raising and lowering the opposite ends simultaneously. And the invention has for a still further object to generally improve this class of devices so as to render them more useful and commercially desirable.

With these and other objects in view as will more fully appear as the description proceeds, the invention consists in certain constructions, arrangements and combinations of the parts that I shall hereinafter fully describe and claim.

For a full understanding of the invention reference is to be had to the following description and accompanying drawings, in which:—

Figure 1 is a view illustrating the shovel in position above a stream, showing the position of the shovel in which it may be when carrying a load; Fig. 2 is a top plan view of the shovel; Fig. 3 is an end view of the same; Fig. 4 is a bottom view of the shovel; Fig. 5 is a perspective view of the shovel; Fig. 6 is a perspective view of a modified form of the shovel; Figs. 7, 8, 9 and 10 are sectional views of the shovel in different positions that it may assume while in operation.

Corresponding and like parts are referred to in the following description and indicated in all the views of the accompanying drawings by the same reference characters.

In the form of the shovel as illustrated in Fig. 5 the same consists of a body 1 which is preferably made from cast steel or other relatively hard material. This body 1 is open at its ends and is provided with a bottom 2 and vertical sides 3. Curved beams 4 are formed at the upper corners of the sides 3 and the beams at the opposite ends of the body have their upper ends disposed inwardly toward each other. The ends of the sides 3 are chamfered or beveled as at 5 forming cutting edges. The material of which the bottom 2 is composed at the side edges of the said bottom projects beyond the cutting edges 5 and constitutes shares 6. The cutting edges of the shares 6 merge into cutting edges 7 which are provided at the intermediate portions of the ends of the bottom 2. Ribs 8 are formed at the bottom 2 at the ends thereof and approximately midway between the sides 3 and serve as means for splitting the material as it enters the shovel and directing the same to the opposite side portions thereof, thereby preventing the material from accumulating to an excess at one side portion only of the body 1. The bottom 2 is provided at its ends and approximately midway between its side edges with bit portions 9 which project beyond the cutting edges 7. Each beam 4 is provided with a series of apertures 10 and a shackle 11 is pivotally connected to each beam by means of a pivot bolt 12 which passes through the end of the shackle and one of the apertures 10. Rings 13 engage the shackles 11 and chains 14 are connected to the said rings. Cables 15 are connected with the chains 14 and at their upper ends are trained through carriers indicated at 16 mounted for movement along a cable 17 which is suspended across the river or canal in which the shovel is to operate and which is retained at its ends by timbers upon the banks or gin poles used in lieu thereof. Any suitable means may be employed for operating the carriers 16 along the cable 17 and for raising and lowering the shovel by means of the cables 15. Such apparatus may be found in my earlier Patents, No. 808,183, dated December 26, 1905, No. 703,222, dated June 24, 1902, No. 759,207, dated May 3, 1904, and No. 816,057, dated March 27, 1906. The beams 4 at the ends of the sides 3 and at the opposite sides of the body 1 are connected together by cross bars 18. The extremities of the end portions of the cross bars 18 are spread against the outer sides of the beams 4 so that the said cross bars are positively held in position with relation to the beams. Inwardly disposed lugs 19 are carried at the upper ends of the beams 4 and serve as means for limiting the swinging movement of the shackles 11 and end gates which will now be described. The end gates, indicated at 20, are adapted to rest at their lower edge portions upon the upper side of the bottom 2 of the body 1 in an inclined position. The said gates are provided at their upper ends with loops 21 which surround the cross bars 18. The lower portions of the said end gates are free to swing in an upward direction until they come in contact with the lugs 19 which limit the upward movement of the said end gates. With the exception of the ribs 8 the upper surface of the bottom 2 is preferably plane. The said bottom is provided upon its under side and at its side edges and its middle with longitudinally disposed ribs 22. These ribs are for the purpose of strengthening and adding rigidity to the bottom of the shovel. The bottom of the shovel is also provided at its under side with a cross rib 23 which is provided with a rounded under surface. The cross rib 23 extends below the ribs 22 so that when the shovel is resting upon a level surface and one of the ends of the bottom is against the surface, the shovel and its bottom are in inclined positions.

In the form of the shovel as illustrated in Fig. 6 of the drawings the same general arrangement of the parts is observed. However, in this form the body 1 is not made in one integral piece, but is composed of an intermediate section 24 with end sections 25, riveted to the ends of the said intermediate section. When the sections 24 and 25 are assembled they constitute a body similar to that hereinbefore described in connection with Fig. 5.

In the form of the shovel as shown in Fig. 6 the beams 4 are not cast integral with the body 1, but are made separately and are attached to the upper corners of the sides of the end sections 25 by means of rivets 26 or other suitable securing devices. In operation, the shovel works as follows: By means of the apparatus hereinbefore referred to, the shovel is lowered into a stream or earth until it rests upon the bottom thereof. Then by drawing the shovel longitudinally in either of two directions the material of the bottom is cut by the cutting edges 7 and the shares 6. At the same time the cutting edges 5 when they come in contact with roots or other obstructions will sever the same and the portions thus severed will be taken up by the shovel as it continues its travel, the material taken up accumulating in the shovel and raising the end gate at the receiving end thereof. When the shovel is filled it is raised and moved to one side or the other of the stream where it is dumped upon the bank or levee. By attaching the shackles 11 to the beams 4 in close proximity to or remote from the upper ends thereof, the shovel may be caused to make a deep or shallow cut, as desired, for it will be understood that during the cutting operation the angle of inclination of the bottom 2 of the shovel will be greater when the shackles 11 are positioned far away from the same than would be the case if the shackles are positioned relatively near the same and vice versa. Also, as the shovel is drawn along the bottom of the river or canal or earth, the cross rib 23 will support the bottom 2 so as to direct one or the other of the ends of the said bottom into the material as the shovel is moved.

Figs. 7, 8, 9 and 10 illustrate approximately the positions of the shovel as it is loaded and as it is elevated. As shown in Fig. 8 the material passes along the bottom of the shovel and the gate 20 at the receiving end is elevated and is held in elevated position by the material, the free end of the shovel resting on and extending partly over the load. If the receiving end of the bucket be now entirely released, the bucket will swing instantly to a vertical position and the load will pass out through the open lower end thereof. The gate cannot swing to the bottom in advance of the escape of the load and, when the bucket is loaded to its full capacity, will tend to fall against the stops 19. Fig. 7 shows the manner in which the shovel so loaded is elevated. The end of the shovel which has received the material is raised higher than the other end and of course the shovel in this position is moving toward that side of the stream which is adjacent the elevated end of the shovel. After the shovel is dumped and is moved toward the other side of the stream it is lowered to the position shown in Fig. 10, when it takes in a load at its opposite end. It is then raised in the position as shown in Fig. 9 and carried to the other side of the stream and dumped. This operation is continuous and consequently it is not necessary to turn the shovel to load and dump the same.

Having thus described the invention, what is claimed as new is:

1. A shovel comprising a body open at its ends and having at the corner portions of its sides inwardly disposed beams each of which is provided with a series of apertures, and shackles adjustably mounted upon the beams.

2. A shovel comprising a body having open ends, inwardly curved beams mounted at the corners of the sides of the body and having inwardly disposed lugs, and gates hingedly mounted at the ends of the body between the beams, the said lugs projecting into the paths of movement of the gates.

3. An excavating shovel comprising a body having an open end through which material enters and is discharged, a gate hung freely in said end of the body to swing inwardly and upwardly as material is taken up and downwardly and outwardly as the material is discharged, suspending cables attached to the ends of the body, and operating means connected with said cables.

In testimony whereof I affix my signature in presence of two witnesses.

TONY ALEXANDER. [L. S.]

Witnesses:
S. E. ORR,
H. C. SKINNER.